April 27, 1948.     S. J. BRUNO     2,440,325
SAFETY DEVICE FOR DUMPING VEHICLES
Filed Aug. 8, 1945     4 Sheets-Sheet 1
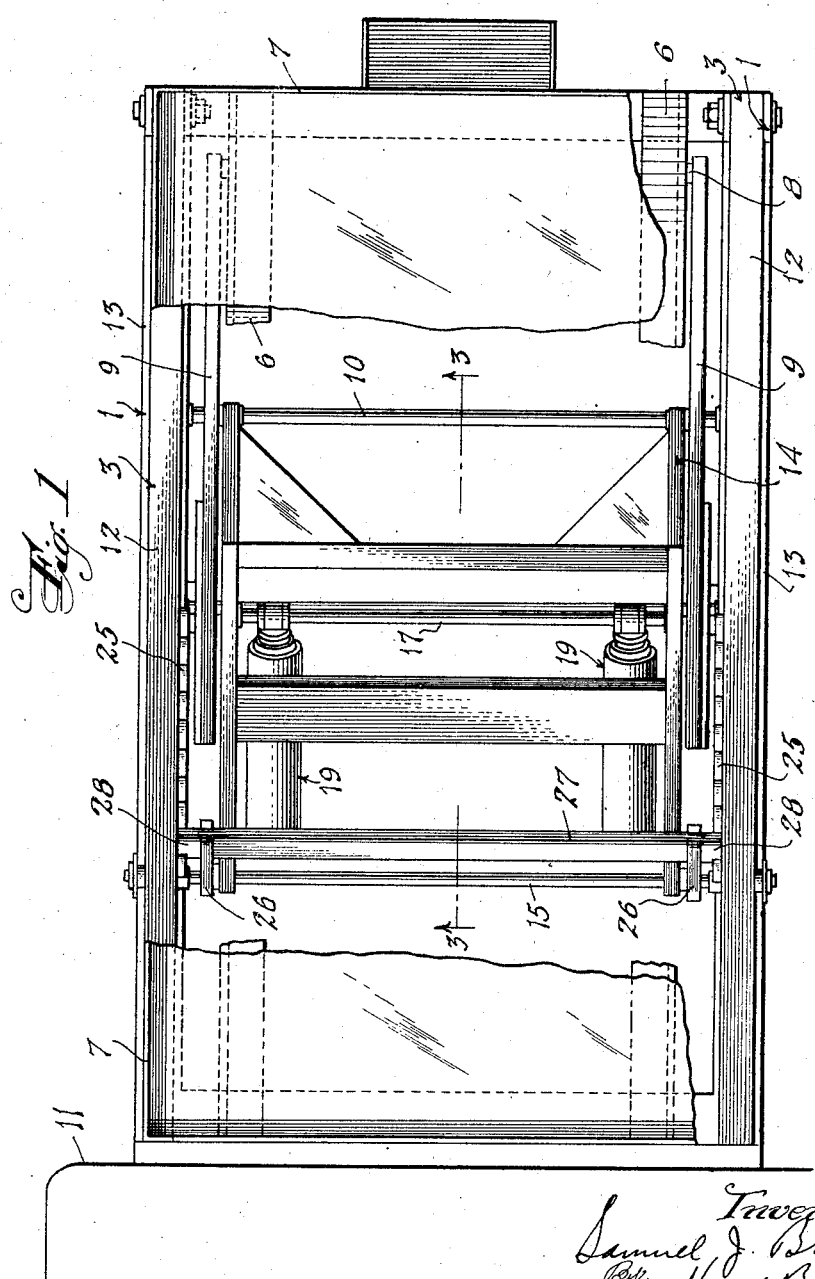

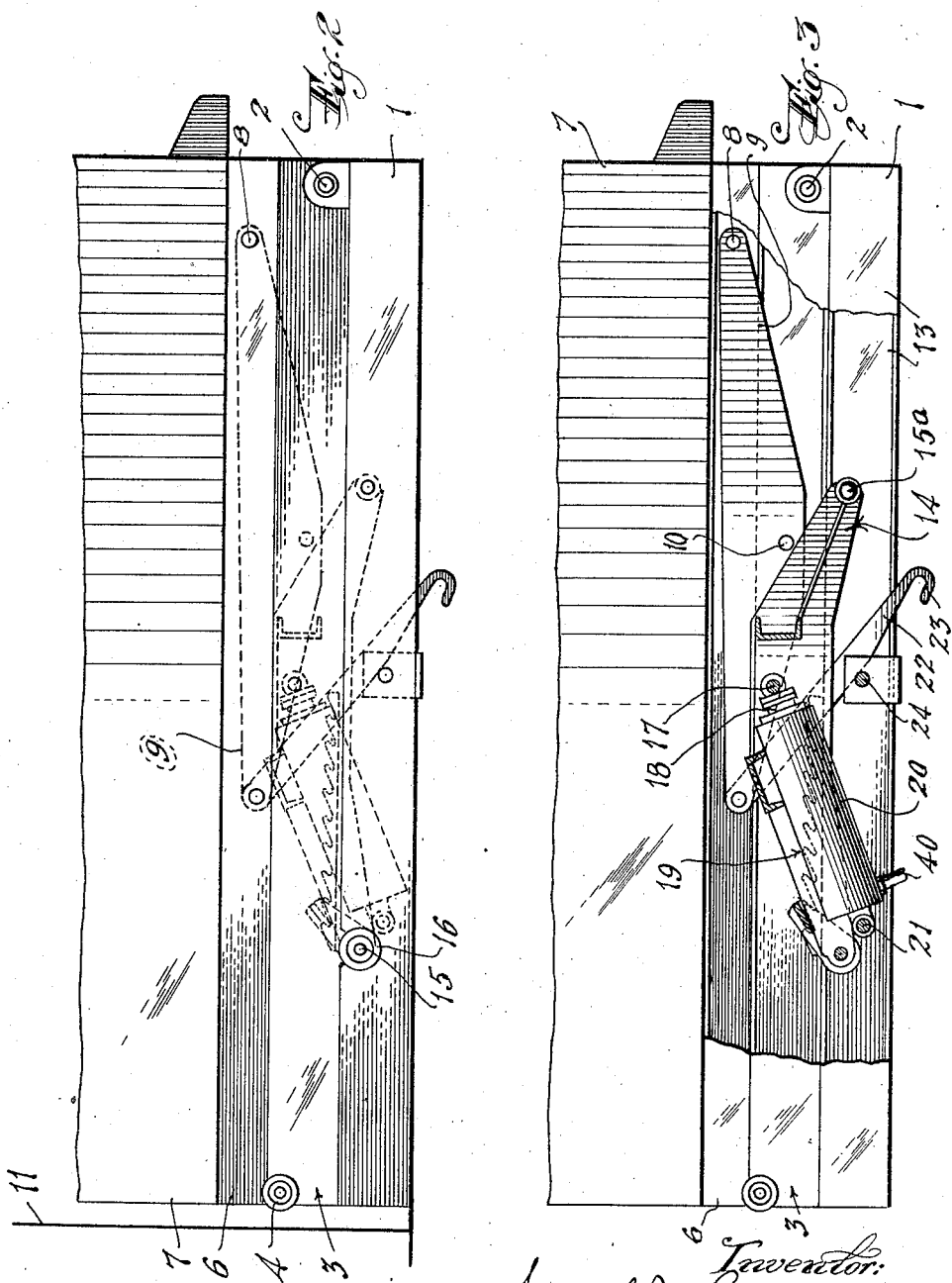

April 27, 1948. S. J. BRUNO 2,440,325
SAFETY DEVICE FOR DUMPING VEHICLES
Filed Aug. 8, 1945 4 Sheets-Sheet 3
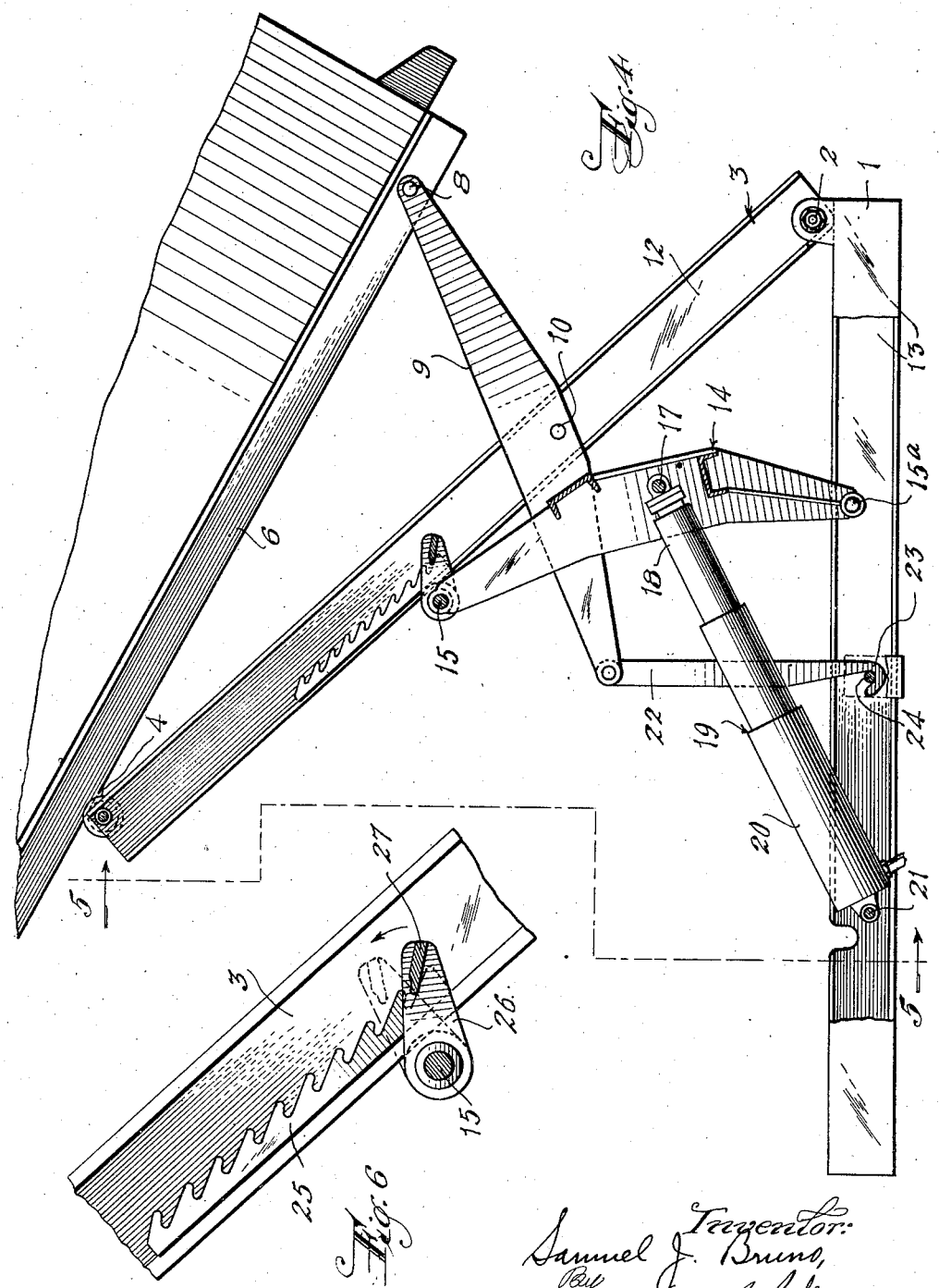

April 27, 1948. S. J. BRUNO 2,440,325
SAFETY DEVICE FOR DUMPING VEHICLES
Filed Aug. 8, 1945 4 Sheets-Sheet 4
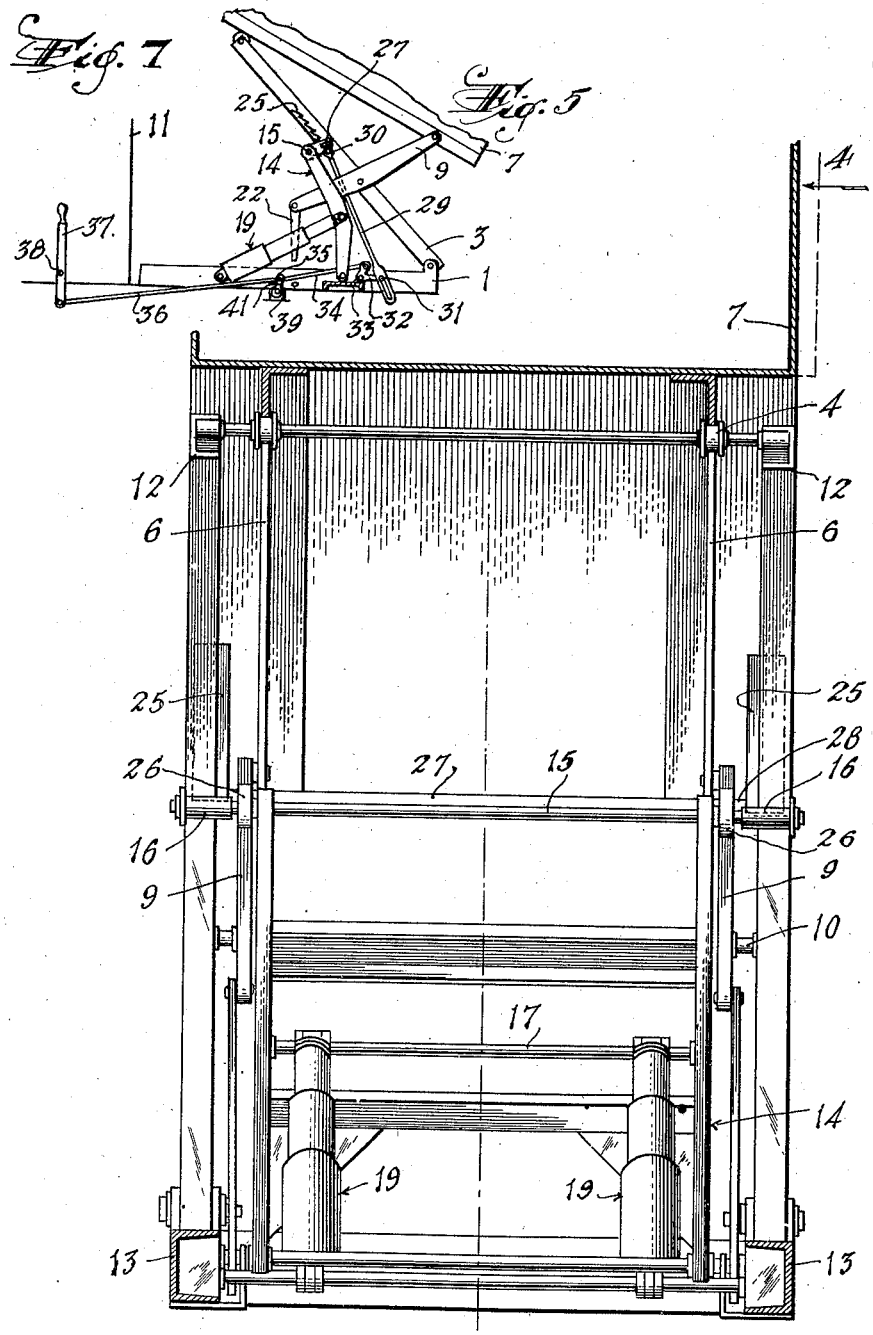

Patented Apr. 27, 1948

2,440,325

UNITED STATES PATENT OFFICE 2,440,325

SAFETY DEVICE FOR DUMPING VEHICLES

Samuel J. Bruno, Belleville, N. J., assignor to The Thomas Wright Co., Inc., Jersey City, N. J., a corporation of New Jersey Application August 8, 1945, Serial No. 609,577

3 Claims. (Cl. 298—38)

This invention relates in particular to the body elevating mechanism of vehicles that have dumping bodies. Elevating mechanism of this character generally includes a system of pivotally connected lever frames interposed between the main vehicle frame and the body, and driving means, for example a hand or motor rotated drum on said main frame for winding chains connected to said lever frames, or hydraulic jacks connected between the main frame and said lever frames, such that upon operation of said driving means the body is elevated or tilted. Unless some means is employed to prevent it, the body may accidentally fall or descend by gravity and cause injury to the operator or to the mechanism in case of failure of the driving means or its connection to said lever frames.

Therefore, a prime object of my invention is to provide a novel and improved safety device for preventing such accidental falling or descent of the vehicle body from an elevated or dumping position.

Another object is to provide a safety device of the character described which shall be simple and inexpensive in construction and reliable and durable in operation.

A further object of the invention is to provide a novel and improved construction and combination of a toothed rack and a pawl and elevating mechanism of the character described such that said rack and pawl shall automatically cooperate to lock said body against accidental descent from any position into which it may be elevated.

Other objects, advantages and results will be brought out by the following description in conjunction with the accompanying drawings in which Figure 1 is a top plan view of a vehicle body and elevating mechanism therefor with portions of the body broken away for clearness in illustration.

Figure 2 is a side elevation of the mechanism shown in Figure 1 with the body in its normal or lowered position.

Figure 3 is a similar view with portions broken away on the line 3—3 of Figure 1, showing the body in its normal lowered position.

Figure 4 is a view similar to Figure 3 but showing the body in its uppermost position.

Figure 5 is a transverse vertical sectional view approximately on the line 5—5 of Figure 4.

Figure 6 is a fragmentary view showing one of the two racks in side elevation and the pawl in vertical section, the parts being shown in the position assumed when the body is elevated as shown in Figure 4.

Figure 7 is a schematic scale view similar to Figure 5, on a reduced scale, showing means for releasing the safety device.

Specifically describing the illustrated embodiment of the invention, the reference character 1 designates the main frame of a vehicle, for example the chassis of a motor truck on which is pivotally mounted at one end as indicated at 2, a lift frame 3 the other end of which has journaled thereon rollers 4 which underlie the forward end of the frame 6 of the body 7 the rear end of which is pivotally connected at 8 to one end of a tilting frame 9 which is pivotally connected intermediate its ends at 10 to the lift frame 3 intermediate the ends of the latter. At the forward end of the chassis or main frame 1 is the usual driver's cab 11 which is only schematically illustrated.

The lift frame 3 preferably comprises two parallel channel beams 12 which are arranged with their channels facing each other and are rigidly connected together so as to move as a unit. Similarly the main frame 1 is shown as comprising two side pieces 13. Arranged between the side pieces 12 of the lift frame and the side pieces 12 of the main frame is a lift header 14 one end of which is pivotally connected to pins 15a mounted in the main frame 1, while the other end has a transverse shaft 15, at each end of which is journaled a roller 16 which underlies the corresponding side pieces 12 of the lift frame.

Intermediate its ends, the lift header 14 has a transverse shaft 17 to which are pivotally connected the ends of piston rods 18 of two hydraulic jacks or motors 19 whose main cylinders 19 and 20 are pivotally connected at 21 to a transverse shaft mounted in the main frame 1.

With this construction, it will be observed that upon operation of the hydraulic jacks, the pistons will be projected so as to swing the lift header 14 upwardly into the position shown in Figure 4, the rollers 16 running along the undersides of the lift frame side pieces 12 so as to swing the lift frame upwardly as shown. With the construction so far described, the body frame will lie on the lift frame 3, but if it is desired to elevate the rear end body, the end of the tilting frame 9 opposite the pivot 8 may have pivotally connected thereto at each side thereof one end of a link 22 the other end of which has a hook 23 which by action of gravity as the lift frame is elevated will engage a cross rod 24 on the main frame and thus cause swinging of the tilting frame 9 into the position shown in Figure 4. It will be understood that by preventing engagement of the hooks 23 with the cross rod 24 as the lift frame is elevated, the tilting frame will not be swung.

The main feature of my invention comprises a safety device for preventing accidental falling or descent of the body or lift frame upon failure of the hydraulic jacks or their connections to the lift header. This safety device is shown as comprising a toothed rack 25 rigidly mounted as by welding on the lower channel of each of the side pieces 12 of the lift frame, with which cooperates a pawl which is shown as comprising a pair of links 26 each pivotally mounted at one end on the shaft 15 between the side pieces 12 of the lift frame and adjacent one of the racks 25. The other ends of the links 26 are rigidly connected by a cross bar 27, the ends of which project beyond the corresponding links as indicated at 28 to engage the adjacent toothed rack 25.

The racks 25 and pawl 26, 27 are so related to each other and the lift header and lift frame that normally when the lift frame is in its lower position as shown in Figures 1 and 3, the ends or teeth 28 of the cross bar lie by action of gravity in engagement with the respective toothed racks. As the lift frame is elevated, the teeth 28 will slide over the teeth of the racks 25 shown in Figure 4 and by solid lines in Figure 6, so that when the operation of the hydraulic jacks is stopped or in case the hydraulic jacks should fail, each tooth 28 will engage one of the teeth of the corresponding rack so as to lock the lift frame and body in the elevated position and thus prevent accidental falling or descent of the lift frame and body.

When it is desired to permit normal descent of the body and lift frame, the pawl 26, 27 is swung toward the forward end of the body as shown in dot and dash lines in Figure 6 so as to clear the toothed racks 25, and allow free relative movement of the pawl and racks as the lift frame swings downwardly.

Any suitable means may be utilized for swinging the pawls 26, 28 upwardly to clear the racks 25, but for the purpose of illustration I have shown one possible means in Figure 7 of the drawings. This means comprises a link 29 which is pivotally connected at one end as indicated at 30 to one of the links 26 and has at its other end a pin and lot connection 31 to one arm of a bell crank 32 which is pivotally mounted on a cross piece 33 on the main frame 1 and has its other arm pivotally connected to one end of a link 34 the other end of which is pivotally connected at 35 to another link 36 which is in turn connected to one end of a hand lever 37 which is pivotally mounted intermediate its ends 38 on any suitable portion of the vehicle, for example in the cab 11.

With this construction, the pin and slot connection 31 permits the necessary lost motion between the link 29 and the bell crank lever due to the swinging of the various parts about different axes, and also permits free sliding of pawls 26, 28 relative to the racks 25 into the desired safety locking relation when the lift frame is elevated. When the lift frame is elevated as shown in Figure 7, the pawls 26, 28 may be disengaged from the racks 25 by swinging the upper end of the hand lever 37 to the right in Figure 7.

It will also be understood that any suitable means may be utilized for controlling the flow of liquid under pressure to and from the hydraulic jacks 19, but conveniently the usual 3-way valve designated 39 in Figure 7 may be connected to a suitable source of liquid pressure for controlling the supply of liquid to the jacks through pipes 40, and said valve may have an operating arm 41 which is pivotally connected at 35 to the link 36, whereby said valve may be operated by the hand lever 37 to release the liquid pressure from the jacks at the same time that the pawls 26, 28 are disengaged from the racks.

While I have shown and described the now preferred embodiment of my invention, it is understood that this is primarily for the purpose of illustrating the principles of the invention and that the details of construction of the safety device may be modified and changed and the safety device may be used with types of elevating mechanisms and driving means other than the lift frame 14 and hydraulic jacks 19, respectively, all within the spirit and scope of the invention.

What I claim is:

1. In mechanism of the character described the combination with a main frame, a lift frame comprising two parallel side pieces rigidly connected together and pivotally mounted on said main frame, means for pivotally swinging said lift frame upwardly including a lift header pivotally connected adjacent one end to said main frame with the other end underlying and movable longitudinally of said lift frame during swinging of the latter, a toothed rack rigidly connected to each said piece, and a pawl for said toothed racks including a pair of links each pivotally connected at one end to said lift header adjacent one of said toothed racks, and a bar rigidly connecting the other ends of said links and having a tooth at each end thereof to engage one of said toothed racks to hold said lift frame in elevated position.

2. In mechanism of the character described the combination with a main frame, a lift frame comprising two parallel side pieces rigidly connected together and pivotally mounted on said main frame, means for pivotally swinging said lift frame upwardly including a lift header pivotally connected adjacent one end to said main frame with the other end underlying and movable longitudinally of said lift frame during swinging of the latter, said side pieces comprising channel beams having their channels facing each other, a toothed rack rigidly mounted on one flange of each channel beam, and a pawl for said toothed racks including a pair of links each pivotally mounted at one end on said lift header between said channel beams and adjacent to one of said toothed racks, and a cross bar rigidly connecting the other ends of said links and having each end thereof projecting beyond the corresponding link to form a tooth to engage the adjacent said toothed rack.

3. In mechanism of the character described the combination with a main frame, a lift frame pivotally mounted thereon, means for pivotally swinging said lift frame upwardly including an element movable relatively to said lift frame, a toothed rack rigidly mounted on said lift frame, a pawl pivotally connected to said element to slide freely over said toothed rack as said lift frame is elevated and to automatically engage said rack by gravitational action to hold said lift frame in elevated position, and means for disengaging said pawl from said rack to permit descent of said lift frame, said means including a link pivotally connected to said pawl, and a lever on said main frame pivotally connected to said link.

SAMUEL J. BRUNO.

REFERENCES CITED

The following references are of record in the file of this patent:

UNITED STATES PATENTS

| Number | Name | Date |
| --- | --- | --- |
| 2,144,599 | Anthony | Jan. 17, 1939 |
| 2,407,012 | Hutchinson | Sept. 3, 1946 |